(12) United States Patent
Rubio Mateos et al.

(10) Patent No.: US 11,267,090 B2
(45) Date of Patent: Mar. 8, 2022

(54) SYSTEM FOR SUPPORTING WORKPIECES

(71) Applicant: FUNDACIÓN TECNALIA RESEARCH & INNOVATION, San Sebastián (ES)

(72) Inventors: Antonio Rubio Mateos, San Sebastián (ES); Asun Rivero Rastrero, San Sebastián (ES); Arantxa Apaolaza Arroyo, San Sebastián (ES)

(73) Assignee: FUNDACIÓN TECNALIA RESEARCH & INNOVATION, San Sebastián (ES)

( * ) Notice: Subject to any disclaimer, the term of this patent is extended or adjusted under 35 U.S.C. 154(b) by 164 days.

(21) Appl. No.: 16/720,317

(22) Filed: Dec. 19, 2019

(65) Prior Publication Data

US 2020/0198074 A1 Jun. 25, 2020

(30) Foreign Application Priority Data

Dec. 20, 2018 (EP) .................................... 18382965

(51) Int. Cl.
*B23Q 3/10* (2006.01)
*B23Q 3/04* (2006.01)
*B25B 11/00* (2006.01)

(52) U.S. Cl.
CPC .............. *B23Q 3/107* (2013.01); *B23Q 3/04* (2013.01); *B25B 11/00* (2013.01)

(58) Field of Classification Search
CPC ... B65G 7/04; B65G 7/08; B23Q 3/18; B23Q 1/032; B23Q 1/035; B25B 11/00; B25B 11/002
See application file for complete search history.

(56) References Cited

U.S. PATENT DOCUMENTS

| 3,559,980 | A | * | 2/1971 | Terai | .......................... E04B 1/36 269/20 |
| 4,527,783 | A | | 7/1985 | Collora et al. | |
| 4,660,815 | A | | 4/1987 | Rosser | |
| 4,684,113 | A | * | 8/1987 | Douglas | .................. B23Q 1/035 269/21 |

(Continued)

FOREIGN PATENT DOCUMENTS

| DE | 10230270 A1 * | 6/2003 | ............. B23Q 1/035 |
| ES | 2258893 | 9/2006 | |

(Continued)

OTHER PUBLICATIONS

Machine Translation of WO 2017203067. http://translationportal.epo.org/ (Year: 2021).*

*Primary Examiner* — Tyrone V Hall, Jr.
(74) *Attorney, Agent, or Firm* — Carmody Torrance Sandak & Hennessey LLP

(57) ABSTRACT

A system for supporting workpieces comprises a base and a plurality of support members (1), each support member (1) comprising a plate (11) and means for positioning the plate (11) in relation to the base. In at least some of the support members (1). The means for positioning the plate (11) comprise at least three controllably extendable members (13) arranged for determining the position and inclination of the plate (11) in relation to the base, thereby allowing for controlled positioning of the plate (11) in relation to the base and for controlled inclination of the plate (11).

15 Claims, 10 Drawing Sheets

(56) References Cited

U.S. PATENT DOCUMENTS

| | | | |
|---|---|---|---|
| 6,808,344 B2 | 10/2004 | Chen | |
| 7,810,940 B2 * | 10/2010 | Schramek | ............. G02B 7/183 |
| | | | 359/881 |
| 2001/0010283 A1 | 8/2001 | Caspi et al. | |

FOREIGN PATENT DOCUMENTS

| FR | 2841809 | | 1/2004 | |
|---|---|---|---|---|
| WO | WO-2011064349 A1 * | 6/2011 | ............. B25B 11/00 |
| WO | WO-2017203067 A1 * | 11/2017 | ............... B23Q 1/03 |

* cited by examiner

SYSTEM FOR SUPPORTING WORKPIECES

TECHNICAL FIELD

The present invention relates to a system for supporting workpieces that is configured for allowing adaptation of the system to different kinds of workpieces, especially large workpieces featuring different curvatures.

STATE OF THE ART

Machining workpieces involves supporting the workpieces in relation to one or more tools, for example, to prevent undesired relative movement between workpiece and tool during machining. Special challenges are faced when, for example, the workpieces are large and feature curved shapes. It may be necessary to provide for support of the workpiece at a large number of positions along and across the workplace or continuously throughout a large area of the workpiece, and this support must be such as not to cause damage to the workpiece, in spite of the often large forces that are exerted on the workpiece during machining. Examples of such workpieces are aircraft fuselage components which are often relatively large and relatively thin.

It is known in the art to support this kind of workpieces on a two-dimensional array of support members, sometimes via some kind of flexible cover that is supported on the support members and on which the workpiece can rest, thereby preventing direct contact with the individual support members and distributing the load over a larger area. The flexible cover is generally some kind of plate or similar and generally features a certain rigidity and is therefore often referred to as "semi-flexible" in the art. This kind of support systems are known from, for example, ES-2258893-A1, ES-2354793-A1 and WO-2017/203067-A1. For example, WO-2017/203067-A1 discloses a system in which the curvature of the cover can be adapted by modifying the height of individual support members and the inclination of their end portions, thereby allowing for adaptation of the curvature of the support to the curvature of the workpiece, such as to the curve of a portion of an aircraft fuselage component or similar. In WO-A-2017/203067-A1 it is explained how the adaptation of the position of the support members can be carried out by the head of the machine that is used for machining the workpiece, thereby making efficient use of the equipment. As disclosed in document WO-A-2017/203067-A1, this requires the flexible cover to be removed prior to adaptation of the position and orientation of the support members.

DESCRIPTION OF THE INVENTION

A first aspect of the invention relates to a system for supporting workpieces, the system comprising a base and a plurality of support members, each support member comprising a plate and means for positioning the plate in relation to the base. In at least some of the support members, the means for positioning the plate comprise at least three controllably extendable members arranged for determining the position and inclination of the plate in relation to the base, thereby allowing for controlled positioning of the plate in relation to the base and for controlled inclination of the plate.

The term "controllably extendable member" encompasses any member that can be extended and the extension of which can be controlled so as to determine the distance between two portions (such as end portions) of the extendable member, thereby allowing for the distance between two items to which the extendable member is connected to be determined. The use of three extendable members allows control of the distance between three points of the plate in relation to three points on the base. Thus, by anchoring each of the controllably extendable members to the base and to the plate, the position and inclination of the plate in space can be determined by the selected extension of the three controllably extendable members. For example, the inclination of the plate in all vertical planes can be determined by controlling the extension of the controllably extendable members. In some embodiments, only three controllably extendable members are used, for example, to simplify the overall control of the operation and/or to minimize the costs involved with manufacture and maintenance of the system. It is sometimes preferred to minimize the number of active and/or passive components used. However, in some embodiments a larger number of controllably extendable members is used, for example, for enhanced rigidity and/or to allow the plate to adopt a larger extent of positions and inclinations. For example, in some embodiments, a Gough-Stewart platform configuration is used.

One advantage of this system is that it makes it possible, by controlling the extension of the controllably extendable members, to adapt the position of the plate, such as its height over the base and its inclination in different planes. This is not only an advantage over systems such as the one of WO-2017/203067-A1 which apparently only allows for rotation of the support surfaces according to one axis, but additionally allows for the adaptation of height and inclination to be carried out without removing the flexible cover that sometimes is used for supporting the workplace: the extension of the controllably extendable members can be implemented without any need for removing such a flexible cover.

The term "plate" should be interpreted broadly as encompassing any kind of member providing a support surface for, for example, supporting the cover from below, such as for example a substantially flat two-dimensional support surface. The term "plate" should not be interpreted to imply any limitation in terms of thickness or shape, although it is often preferred that the plate has a larger length and width in the plane of the support surface than its dimension perpendicular to the support surface.

In many embodiments of the invention the machine is adapted for machining large and thin workpieces, that is, workpieces having a relatively large area, such as an area larger than 0.1, 1, 2, 3, or 4 m$^2$, and with a relatively small thickness, such as an average thickness of less than 5, 3, 1 or 0.5 cm. In some embodiments, the workpieces are workpieces for aircraft fuselage components.

The support members may be arranged on the base forming an array of support members with rows and columns, for example, an array comprising 3, 4, 5 or more rows of support members each row comprising 3, 4, 5 or more support members.

In some embodiments of the invention, the system further comprising a flexible cover supported by the plates, whereby the shape of the cover is at least in part determined by the positions and orientations of the plates. Any kind of flexible cover may be used, for example, the kind of flexible (or "semi-flexible") cover that is suggested in prior art documents such as ES-2258893-A1, ES-2354793-A1 and WO-2017/203067-A1.

In some embodiments of the invention, at least some of the support members include, in correspondence with the plate, at least one roller for attachment to the flexible cover, the roller being capable of rotation around at least one axis. In some embodiments of the invention, the roller is capable of rotation around at least two axes. As it is not necessary to remove the cover in order to modify the configuration of the cover by displacing the flexible plates and by pivoting them in accordance with one or more axes by selective change of extension of the controllably extendable members, the cover is preferably attached to the plates, directly or indirectly, in a manner that allows for a certain degree of movement and, especially, rotation, pivotation or change in angle between the cover and the plate. This is preferably implemented by using at least one roller adapted to be attached to the cover and capable of a certain degree of rotation in relation to the plate, according to one, two or more axes.

In some embodiments of the invention, the roller is capable of rotation around at least one axis parallel with a top surface of the plate, and around one axis perpendicular to the top surface of the plate. Thus, the orientation of the plate in space, including its inclination in different planes, can be adapted while it remains connected to the cover, without inducing substantial stresses in the cover. As explained below, the cover, in spite of being flexible, features a substantial rigidity—this is why the term "semiflexible" is often used in the art-, and the intervention of a rotatable roller between plate and cover is useful to allow reorientation of the plates and of the cover without first removing the cover from the plates.

In some embodiments of the invention, the roller is configured for attachment to the cover by magnetic means, by adhesive, by velcro, or by vacuum. These or any other suitable attachment means can be used. Velcro (or Velcro®) is a simple option but in many embodiments other options are preferred, as they may reduce the amount of manual labor needed for removal and replacement of the cover, for example, as part of the installation or maintenance operations.

In some embodiments of the invention, at least some of the support members include means for blocking rotation of the roller. These means serve to freeze or substantially freeze the orientation of the cover in relation to the plate, that is, basically, to reduce mobility of the cover once it has adopted a selected position determined by the position and orientation of the plates. These means for blocking rotation can comprise, for example, electrically, magnetically, pneumatically and/or hydraulically operated members, for example, an expandable member that makes contact against a portion of a roller, such as against a portion of the roller featuring a flat or non-circular cross section, thereby preventing the roller from rotating.

In some embodiments of the invention, the roller has a substantially spherical or cylindrical shape. The reference to a cylindrical shape applies to at least part of the roller and does not exclude that other parts of the roller may have different shapes. In other embodiments the roller can have other shapes, such as a spherical shape.

In some embodiments of the invention, at least some of the controllably extendable members comprise actuators. That is, the extension of teach controllably extendable member is determined by operating the actuator so as to selectively increase and decrease the length of the controllably extendable members. The actuators can be, for example, electrically, pneumatically or hydraulically operated actuators, and their operation may be controlled from a control unit forming part of the system. That is, the controllably extendable members can be regarded as three legs that support the plate in space and the length of which is actively controlled by operating the respective actuator.

In some embodiments of the invention, at least some of the support members comprise passive controllably extendable members, and the support members with passive controllably extendable members additionally comprise a drive member for driving the plate away from the base, whereby the controllably extendable members are configured to each extend while the plate is being driven away from the base, until reaching a pre-selected extension, whereby further extension of the controllably extendable member is prevented when its pre-selected extension is reached. That is, the drive member, for example, an electrically, pneumatically or hydraulically driven drive member, drives the plate away from the base, and the final position and inclination of the plate in space is determined by the pre-selected extension of each controllably extendable member. That is, the controllably extendable members can be regarded as three legs that support the plate in space and the length of which is increased—or decreased, when operating in the reverse direction—by driving the plate with the drive member. In some embodiments of the invention, the drive member comprises at least one inflatable element. Any kind of inflatable member can be used, for example, an inflatable member comprising one or more parts for displacing the plate, and one or more parts for blocking the roller.

In some embodiments of the invention, the controllably extendible members are attached to the respective plate by ball joints. The ball joints allow for free rotation of the controllably extendable members in relation to the base and the plate, whereby the mere adaptation of the extension of each controllably extendible member determines the exact position and orientation of the plate in the space above the base.

In some embodiments of the invention, at least two of the ball joints are arranged for allowing a translational (such as linear) movement thereof, that is, of the entire ball joint or, at least, of the ball thereof, in relation to the plate, so that the distance between the ball joints or, at least, between the respective balls of the ball joints can change as a consequence of extension and retraction of the controllably extendible members. As one or more of the controllably extendable members may extend more than one or more of the other controllably extendable members, it may be necessary to allow for a corresponding adaptation of the position of the respective ball joints or balls with regard to the plate, such as of the distance of the ball joint to a center of the plate or to another reference point on the plate. This can be achieved by, for example, allowing for a translational (such as a linear) movement of the ball of the ball joint or of the entire ball joint, for example, movement according to one or more tracks on or in the plate. In some embodiments, at least one of the ball joints is provided with an additional angular degree of freedom, for example, by allowing the track to pivot in, for example, a plane parallel with a surface of the plate. In other embodiments, a Gough-Stewart platform or other configuration may be preferred to allow the plate to adopt multiple vertical and angular positions. For example, the Gough-Stewart layout always maintains the center of the plate positioned symmetrically with regard to the support points, thus providing for high rigidity. However, it is often preferred to minimize costs of manufacture and maintenance, and therefore it may often be preferred to use a limited number of controllably extendable members, such as only three controllably extendable members.

In some embodiments of the invention, the cover comprises a layer of an elastomeric material, and the cover additionally comprises a plurality of rigidifying members of a material having a higher rigidity than the material of the layer. The rigidifying members are arranged so that they are axially displaceable in relation to the layer. The use of a flexible elastomeric material makes it possible to adapt the shape of the layer also to relatively complex geometries, without any creation of folds or wrinkles, etc., or at least without an excessive creation of unwanted wrinkles or folds. This kind of materials also make it possible to establish zones with vacuum conditions that help to keep the workpiece fixed in its position, that is, locked by vacuum established in correspondence with parts of the cover. Also, the flexible elastomeric material absorbs vibrations that are produced during machining of the workpiece. Now, sometimes the flexibility needed to allow the cover to adapt itself to different configurations is in conflict with the need for, for example, a certain distance between the plates of the support members, and with other aspects of the machine that require a certain minimum of rigidity of the cover. This can at least in part be overcome by adding elements such as filaments, rods, strings or strips that feature a higher rigidity and that extend in channels within the layer of flexible material. These filaments are axially moveable with regard to the layer of elastomeric material. Thereby, changes in curvature of the cover do not require axial elongation of the rigidifying members. In many embodiments the material of the rigidifying members has an elastic limit that that is lower than the elastic limit of the elastomeric material of the layer, but high enough to avoid plastic deformation when the curvature of the cover changes. The rigidifying members may extend in any directions, such as, for example, at an angle to each other, forming a mesh-like structure. The use of this kind of rigidifying members makes it possible to use a wide range of materials for the layer of elastomeric material, while still achieving sufficient overall rigidity.

In some embodiments of the invention, at least some of the rigidifying members comprise a core of a material having higher rigidity than the elastomeric material, the core being surrounded by at least one layer of a material having a lower rigidity than the material of the core but a higher rigidity than the elastomeric material. It has been bound that this can serve to prevent or reduce the risk of undesired deformations due to the difference between the rigidity of the core and the rigidity of the elastomeric material.

In some embodiments of the invention, the cover comprises through holes. It has been found that through holes may help to prevent the occurrence of folds or wrinkles when the curvature is adapted. The loss of overall rigidity produced by the through holes can be compensated, fully or in part, by the presence of the rigidifying members.

In some embodiments of the invention, the elastomeric material is chosen to comply with one or more of the following requirements:

a resistance to deformation for deformation by 10% larger than 0.005 N/mm$^2$ a hardness larger than 25 Shore A a loss factor (mechanical dampening) larger then 0.01 (DIN 53513)

Young's modulus larger than 0.1 MPa

Ultimate tensile strength larger than 0.001 MPa

Additionally, in some embodiments the material preferably features low porosity to facilitate adherence of the cover to the workpiece by vacuum, that is, by suction/u underpressure.

The system may include a central control unit for controlling the displacement and reorientation of the plates by controlled extension/retraction of the controllably extendable members, blocking and release of the rollers, etc. In some embodiments the system includes a subsystem for electronic vision configured for, for example, verifying the configuration of the cover and/or the positions of the controllably extendable members and/or the plates, and for adapting the position of the plates until a desired configuration is achieved, for example, in terms of the real curvature or curvatures featured by the flexible cover.

The system can be used for any appropriate kind of machining operations, including milling, chamfering, boring, drilling, etc. In some embodiments the system can also be used for measuring workpieces, for example, by replacing the rollers on the plates by devices for measuring thickness, such as DCUT sensors. In this kind of configuration, the system may not include the flexible cover, so that the workpiece or object on which measurements are to be carried out can be placed directly on the rollers of one or more DCUT sensors or similar, for measuring characteristics of the object such as its thickness.

Also other sensors can obviously be incorporated in the structure, for example, for the purpose of verifying the state of the system, of the workpiece, and/or of the process. Feedback from the sensors can be used to influence the operation of the system, including the positioning of the plates and the operation of the machining tools. For example, pressure sensors can be incorporated in the cover to verify that the contact with the workpiece is adequate, and/or to detect the presence of chips or other objects between the workpiece and the cover, etc.

A further aspect of the invention relates to a method of modifying the three-dimensional shape of the cover of a system as described above, comprising the steps of:

modifying the position and inclination of a plurality of the plates by selective extension and/or retraction of the three controllably extendable members, while allowing the rollers to rotate;

thereafter, blocking the rollers so as to prevent them from rotating.

For example, modification or adaptation of the position and inclination of the plates can take place sequentially, displacing and reorienting one plate after the other until the entire array or similar of plates has adopted its new configuration, while allowing the rollers to rotate according to their degrees of freedom, for example, by rotating in the plane of the plates and/or around their axes, or in any other way. Once all plates have reached their final position, rotation can be prevented by blocking the rollers, thereby enhancing the rigidity of the system.

BRIEF DESCRIPTION OF THE DRAWINGS

To complete the description and in order to provide for a better understanding of the invention, a set of drawings is provided. Said drawings form an integral part of the description and illustrate some embodiments of the invention, which should not be interpreted as restricting the scope of the invention, but just as examples of how the invention can be carried out. The drawings comprise the following figures:

FIGS. 13A-13O schematically illustrate movement of the ball joints of the embodiment of FIGS. 12A-12C, following one possible modification of the extension of the corresponding controllably extendable members during operation of the system.

DESCRIPTION OF A WAY OF CARRYING OUT THE INVENTION

Figure 1A:
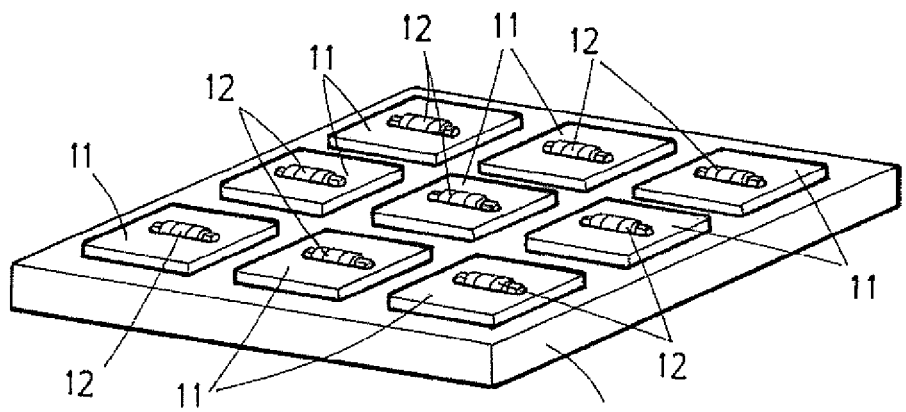
FIGS. 1A-1C are schematic perspective views of an array of support members in accordance with an embodiment of the invention.
Figure 1B:
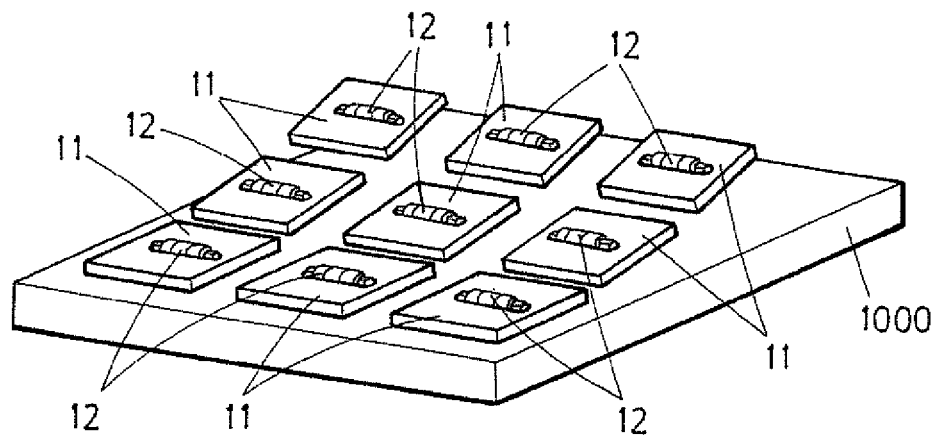
Figure 1C:
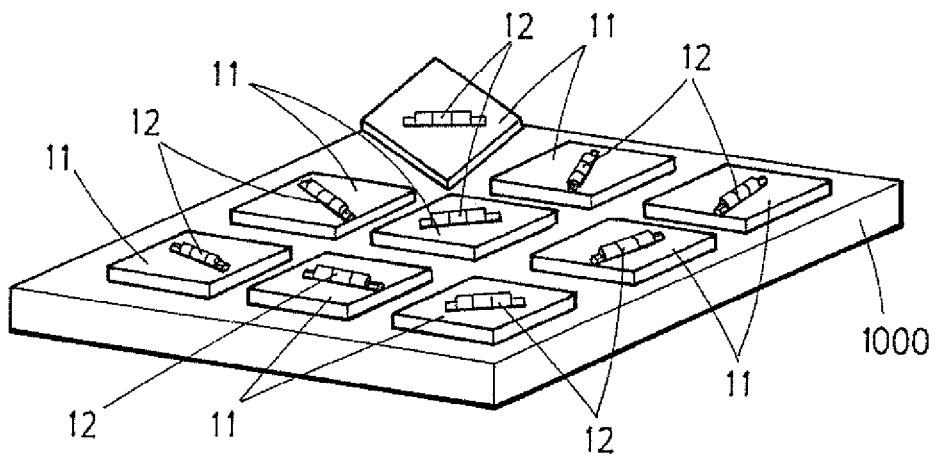

FIGS. 1A-1C schematically illustrate an array of support members of a system in accordance with an embodiment of the invention. In these schematic figures, only the plates 11, the rollers 12 and the base 1000 are shown. In FIG. 1A the plates 11 are arranged coplanar with the base 1000. In FIG. 1B, the plates 11 in two of the three rows of plates are inclined and raised in relation to the base, the height over the base and the inclination with regard to the base being larger in the last row than in the middle row. In FIG. 1C, a different configuration of the plates 11 has been established, with the plate in a corner of the illustrated 3×3 array being inclined, facing towards the center of the array. As easily understood, the flexible cover (not shown in FIGS. 1A-1C) supported by the plates will adopt different configurations and curvatures depending on the heights and orientations of the plates. For example, the positions and orientations of the plates 11 in FIG. 1A will provide for a flat configuration of the cover, whereas the configuration shown in FIG. 1B will provide for what can be regarded as a simple curvature of the cover. The configuration shown in FIG. 1C can provide for what can be regarded as a double curvature of the cover supported by the plates. The cover is attached to the rollers 12, and as can be readily understood from FIGS. 1A-1C, rotation of the rollers 12 around their longitudinal axes and rotation of the rollers with regard to an axis perpendicular to the plate (see the change of the position of the rollers between FIGS. 1B and 1C) allow this reconfiguration of the cover to take place without any need to remove the cover from the plates.

Figure 2:
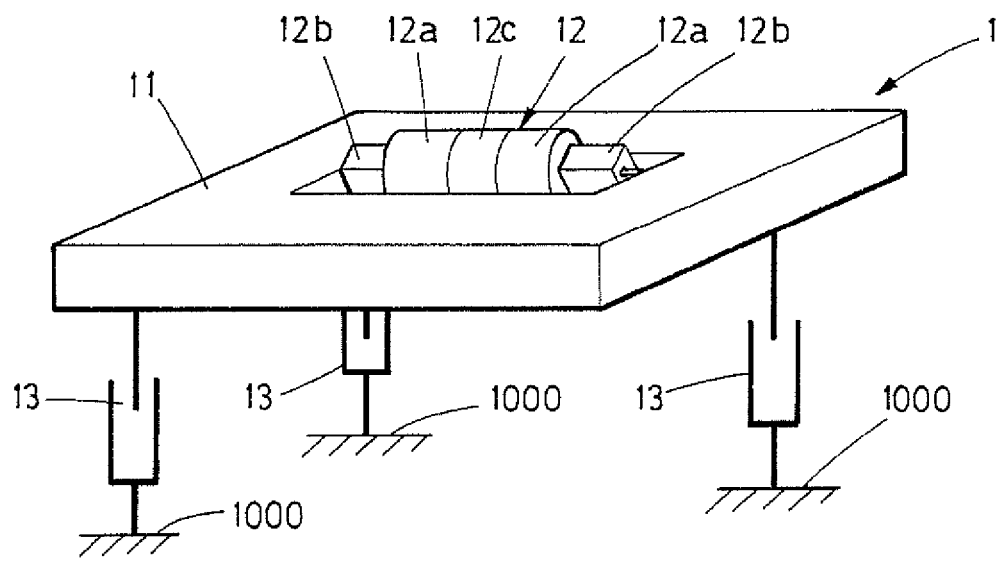
FIG. 2 is a schematic perspective view of a support member in accordance with the embodiment of the invention.

FIG. 2 schematically illustrates a support member 1 in accordance with an embodiment of the invention. The support member comprises three controllably extendable members 13 that support a plate 11 provided with a roller 12. The controllably extendable members may be active members (such as electrically, pneumatically or hydraulically driven actuators) or passive member (such as pneumatic dampers or brakes that can be blocked when reaching a certain position, detected by a corresponding sensor). When the controllably extendable members are passive, an additional drive means is needed to drive the plate towards the desired position. The controllably extendable members are attached to the base 1000 and to the plate 11. The attachment to the plate is established by for example ball joints or other joints that allow for a change in angle between the plate 11 and the respective controllably extendable member 11. Thus, depending on the degree of extension of the three controllably extendable members, the plate can reach any height and adopt any inclination within the limits of operation of the controllably extendable members, which is restricted by the amplitude of movement of each individual controllably extendable member and additionally by the fact that the three controllably extendable members are linked to the plate. Especially, the plate can be inclined in various directions, thereby allowing for, for example, double curvatures as suggested by for example FIG. 1C.

In the illustrated embodiment, the roller 12 comprises a central cylindrical portion and two non-cylindrical portions 12b that can be used to block rotation of the roller once a new configuration of the system has been established, as further discussed below. Additionally, a velcro string 12c provided for attaching the roller to the flexible cover is schematically illustrated in FIG. 2.

Figure 3:
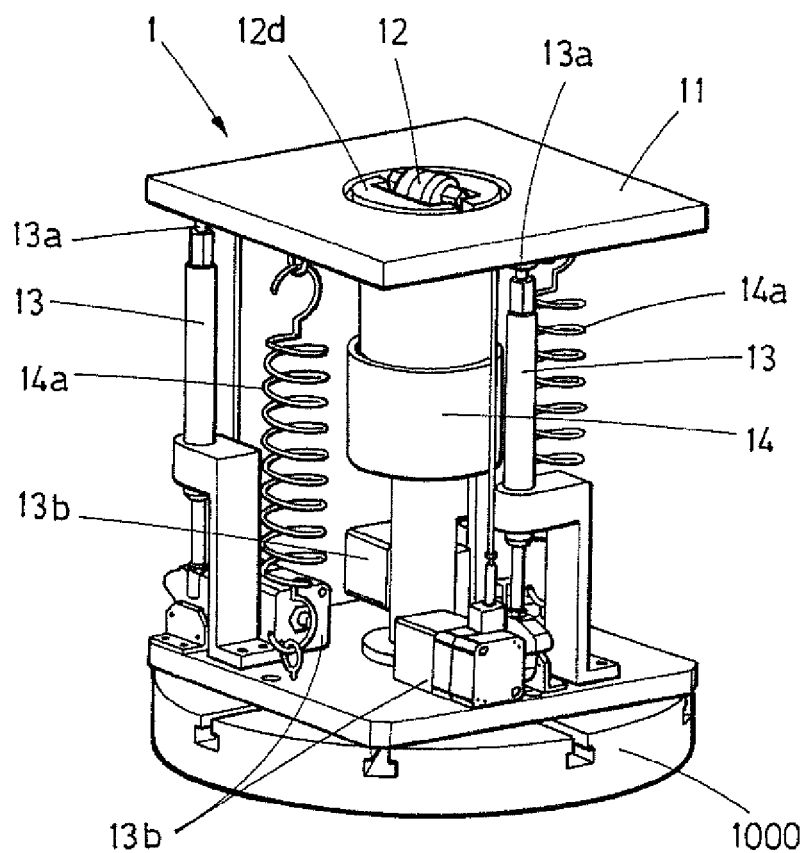
FIG. 3 is a schematic perspective view of a support member in accordance with an embodiment of the invention, using passive controllably extendable members.

FIG. 3 schematically illustrates a support member 1 including a plate 10 that is positioned in regard to a base 1000 by three controllably extendable members 13, in this case, blockable gas springs, for example, of the type "Gas Top" obtainable from VAPSINT®. The gas springs 13 are attached to the plate by schematically illustrated ball joints 13a. Each controllably extendable member is associated to a sensor 13b that detects the extension of the controllably extendable member (gas spring) 13 and that triggers blocking of the controllably extendable member 13 once it reaches a predetermined extension. In some embodiments, other detection means such as for example an electronic vision system may be used instead of (or in addition to) this kind of sensors.

Additionally, a pneumatic drive member 14 is provided for pressing the plate 11 upwards, away from the base 1000, until it reaches an end position determined by the extension reached by the three controllably extendable members 13. As the controllably extendable members 13 may reach different extensions, the plate 11 can end up with a selected inclination. Bias springs 14a are provided for pulling the plate back towards its start position when the pneumatic drive member 14 deflates. A roller 12 is schematically illustrated in correspondence with the top surface of the plate 11. Any kind of controllably extendable member can be used, although selection of the controllably extendable member should take into account aspects such as the need to withstand forces exerted on the controllably extendable members not only by the workpiece placed on the cover, but also forces exerted on the workpiece during machining, such as boring, milling, etc. Whereas the flexible cover placed between the plates and the workpiece may absorb part of such forces and vibrations, substantial forces will nevertheless often be applied to the plates 11.

Figure 4A:
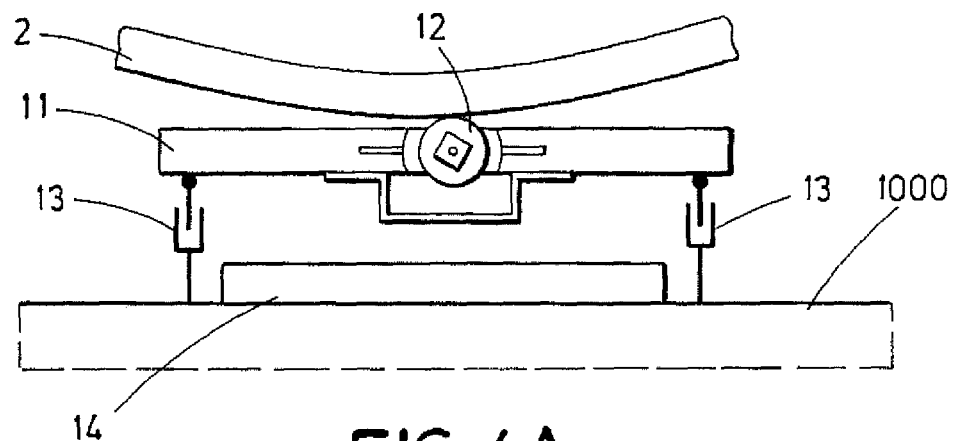
FIGS. 4A-4C schematically illustrate a process of change of orientation and position of the plate of a support member with passive controllably extendable members.
Figure 4B:
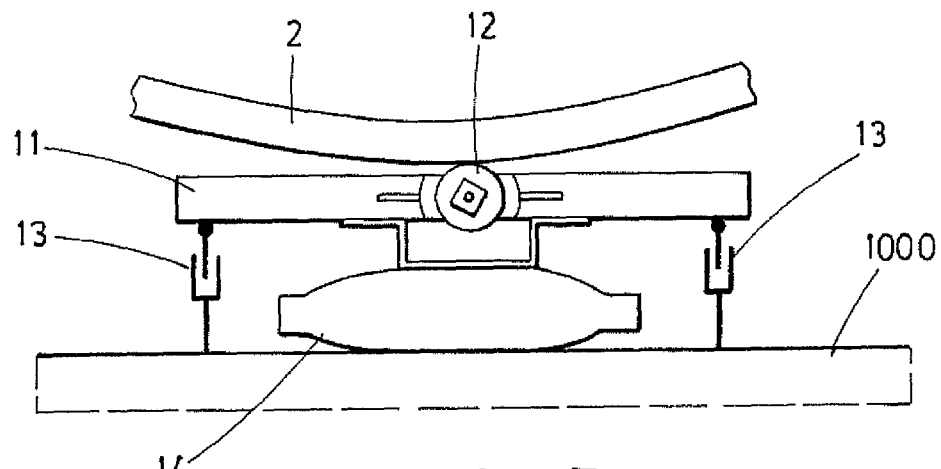
Figure 4C:
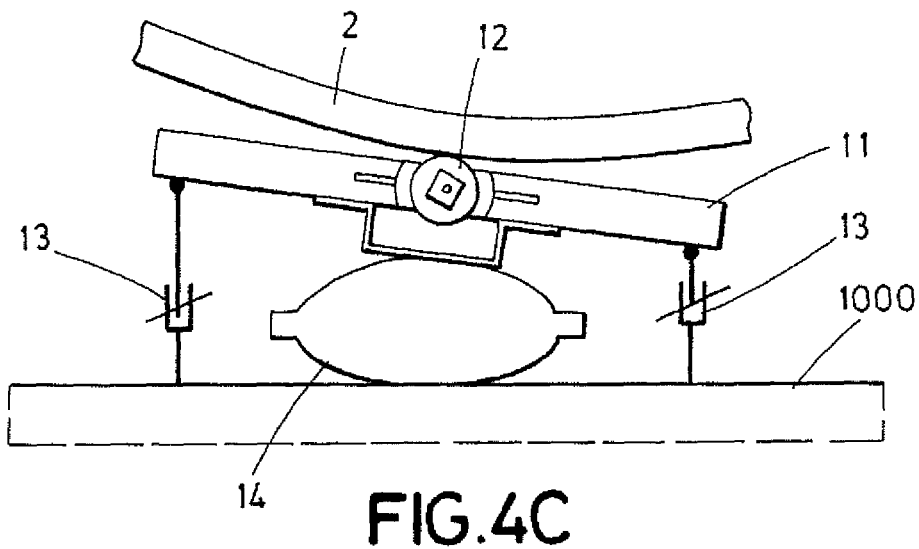

FIGS. 4A-4C schematically illustrate how a plate 11 of a support member is moved from a low position in which it is coplanar with the base 1000 (FIG. 4A) to a higher position in which it is inclined with regard to the base 1000, by expansion of a pneumatic or hydraulic drive member 14. The extension of the controllably extendable member 13 at the right is blocked prior to the extension of the controllably extendable member 13 at the left, thereby leaving the plate inclined towards the right. In FIGS. 4A-4C the schematically illustrated flexible cover 2, on which the workpiece (not illustrated) is intended to rest (directly or indirectly), is attached to the plate 11 via a roller 12. It can be understood that rotation of the roller 12 around its axis allows for reorientation of the cover with regard to the plate as the plate is raised and inclined, without causing excessive stresses to the cover, allowing the cover to retain a neat curvature. In this way, the entire reconfiguration of the support surface represented by the plates and by the cover resting on the plates can be achieved without any need for removing or releasing the cover from the plates. Once all support members 1 of the system have reached their final position, the rollers can be blocked to enhance rigidity of the support provided to the workpiece by the cover 2 and by the support members 1 supporting the cover 2.

Figure 5A:
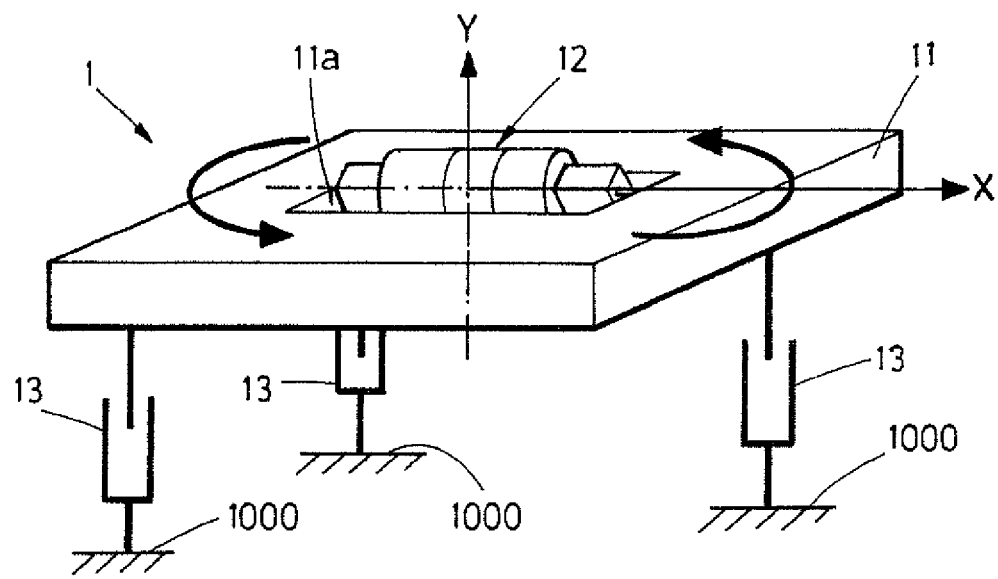
FIGS. 5A and 5B schematically illustrate how the rollers of a support member can be arranged to be rotatable around two different axes, in accordance with an embodiment of the invention.
Figure 5B:
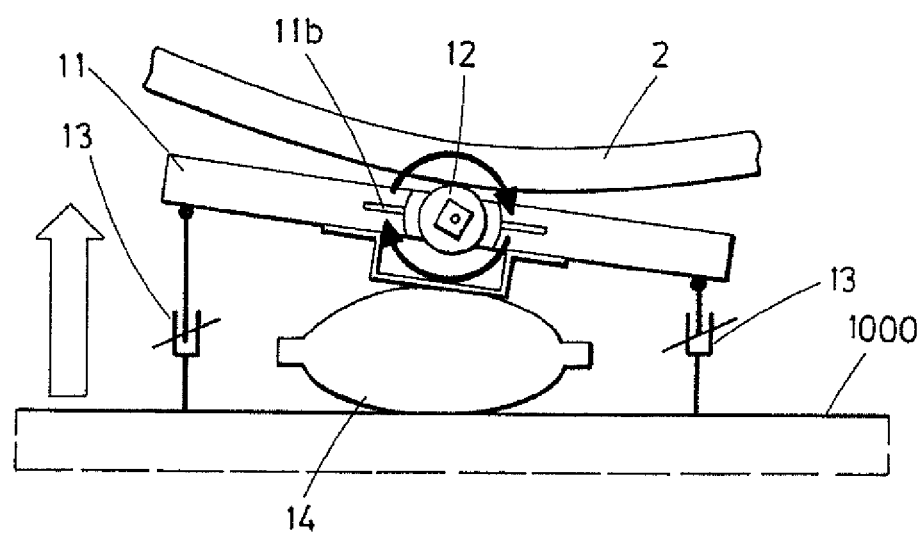

FIGS. 5A and 5B schematically illustrate how the roller is rotatable around two axes, that is, one axis Y perpendicular to the surface of the plate 11 (FIG. 5A) and one axis X that is parallel with the surface of the plate and corresponds to the longitudinal axis of the roller. For example, the roller can be arranged in a recess 11a in the plate (schematically illustrated in FIG. 5A) and comprise a shaft passing through the cylindrical and non-cylindrical portions of the roller, this shaft being arranged in a groove or channel 11b (schematically illustrated in FIG. 5B) such that it can rotate, at least to a certain extent, in the plane of the plate. Alternatively, for example, the roller can be arranged with its shaft rotatable in a platform 12d schematically illustrated in FIG. 2, which can be rotatably guided in the groove 11b in the plate. Any other suitable configuration can be used. The flexible cover 2 (schematically illustrated in FIG. 5B) is attached to the roller, and the two-axis degree of freedom of the roller 12 in relation to the plate 11 thus allows for the variation in inclination of the plate in different directions, without inducing excessive stresses into the cover, so that the cover can adopt a smooth curvature also where it is connected to the plates, when changing from one configuration of the system to another, adapting the configuration including curvatures of the cover.

Figure 6A:
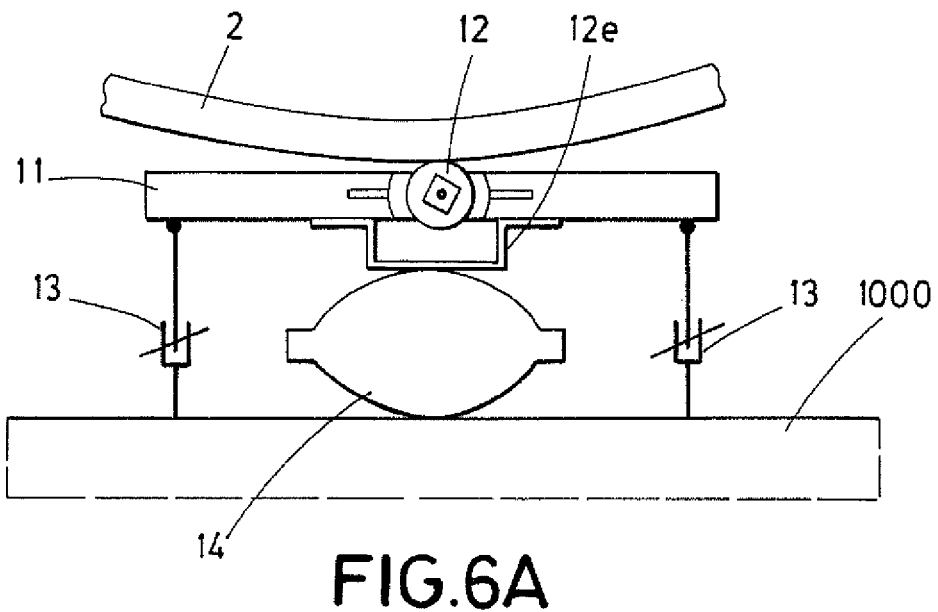
FIGS. 6A and 6B schematically illustrate the concept of elevation of the plate followed by blocking of the roller of a support member, in accordance with an embodiment of the invention.
Figure 6B:
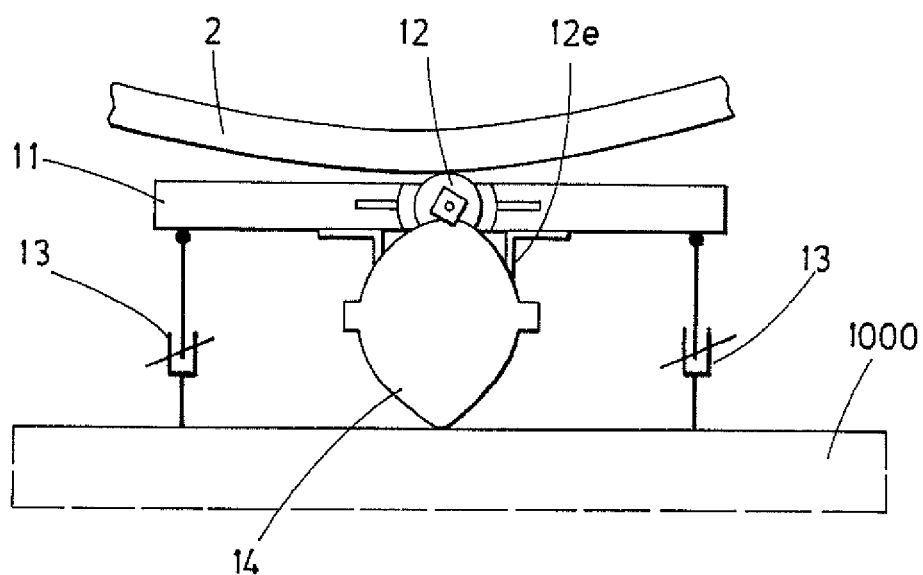

FIGS. 6A and 6B show how a drive member 14 can be used to first drive the plate 11 upwards from the base 1000 and thereafter to block the roller 12 by, for example, applying pressure onto a non-cylindrical portion of the roller. For example, in the illustrated embodiment, the drive member 14 abuts against an element 12e that prevents contact between the drive member and the roller during an initial phase of expansion of the drive member (see FIG. 6A). However, when the controllably extendable members 13 have reached their final extension, continued expansion of the drive member may cause part of it, or a separate expandable member, to contact the roller, for example, in correspondence with its axial ends where it features a non-cylindrical cross section. However, any other suitable means for blocking the roller can be provided. When using active controllably extendable elements 13, no separate drive member may be needed for displacing the plate, and separate means for blocking the roller may be needed.

Figure 7:
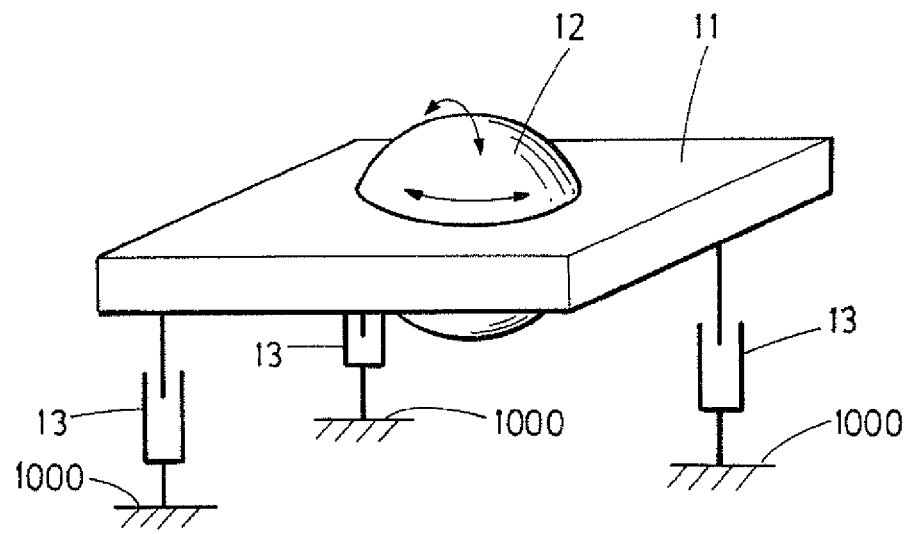
FIG. 7 is a schematic perspective view of plate and roller in accordance with another embodiment of the invention.

Instead of a cylindrical roller, in other embodiments of the invention other kinds of rollers may be used, such as a spherical roller 12 as schematically illustrated in FIG. 7, capable of rotation in all directions.

Figure 8:
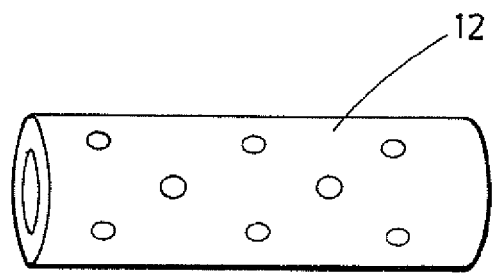
FIG. 8 schematically illustrates a roller of a support member in accordance with one possible embodiment of the invention.

In the embodiment of FIG. 2, a velcro string 12c is used for attaching the flexible cover to the roller. However, in accordance with other embodiments, any other suitable means of connection may be used. For example, magnetic means can be used to attach a cover comprising ferromagnetic elements to the roller. In other embodiments, an adhesive may be used. Another one of the many available options is using vacuum means to attract the cover to the roller. For example, a roller with perforations as schematically illustrated in FIG. 8 may be used.

As it can be readily understood from for example FIGS. 1A-1C, adaptation of the configuration of the system including the shape adopted by the cover can be achieved by modifying the position of the plates 11, for example, one after the other, until all of the plates have reached their new position. As the plates are interconnected by the cover connected to their rollers, movement of a plate will or may influence the position of the rollers on the adjacent plates, which may rotate in accordance with their degrees of freedom, for example, rotating around the axes as discussed in relation to FIGS. 5A and 5B. When all of the plates have reached their final position, the rollers 12 of one or more plates, such as the rollers 12 of all plates, may be blocked to prevent further rotation, thereby enhancing rigidity of the system. In some embodiments, the rollers may be blocked in sequence, one after the other.

Any suitable cover may be used, as long as it is sufficiently flexible to adapt its shape to different positions and inclinations of the plates, allowing for adaptation of the support surface for the workpiece. In some embodiments, opening or through holes are provided in the cover to facilitate its adaptation to more or less complex curvatures while preventing the formation of folds or wrinkles in the cover. Now, to maintain a suitable rigidity, the cover may include additional rigidifying members, such as strips or rods of a material with higher rigidity than the material used for most of the cover.

Figure 9:
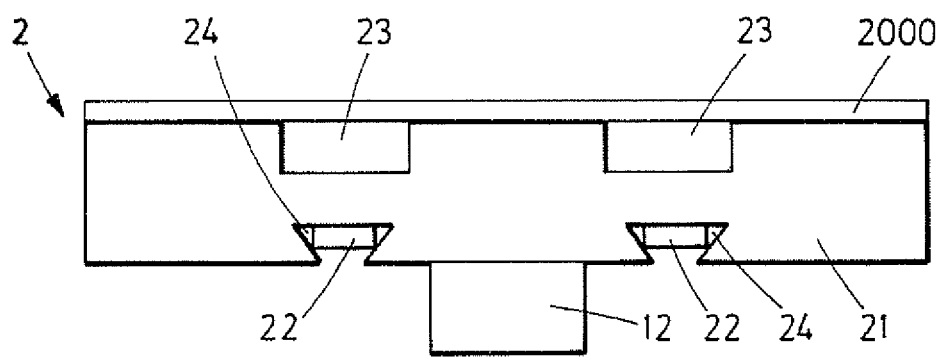
FIG. 9 is a schematic cross section of the flexible cover in accordance with one embodiment of the invention.

FIG. 9 schematically illustrates an embodiment of this kind of cover 2, comprising a layer 21 of an elastomeric material attached to a roller 12 of a support member. A schematically illustrated workpiece 2000 is placed on the layer 21, which is provided with channels 23 for retaining the workpiece by vacuum produced by vacuum equipment not shown in FIG. 9. Additionally, rigidifying strips 22 are provided in channels 24 in the bottom surface of the layer 21. These strips serve to enhance the overall rigidity of the cover, thereby allowing for enough flexibility and elasticity so that the cover may adopt different curved shapes determined by the positions and orientations of the plates of the support members, while ensuring sufficient rigidity in order to, for example, allow for a substantial spacing between the support members. In some embodiments, the distance between adjacent support plates 11 may be larger than 1 cm, such as larger than 20 cm.

Figure 10A:
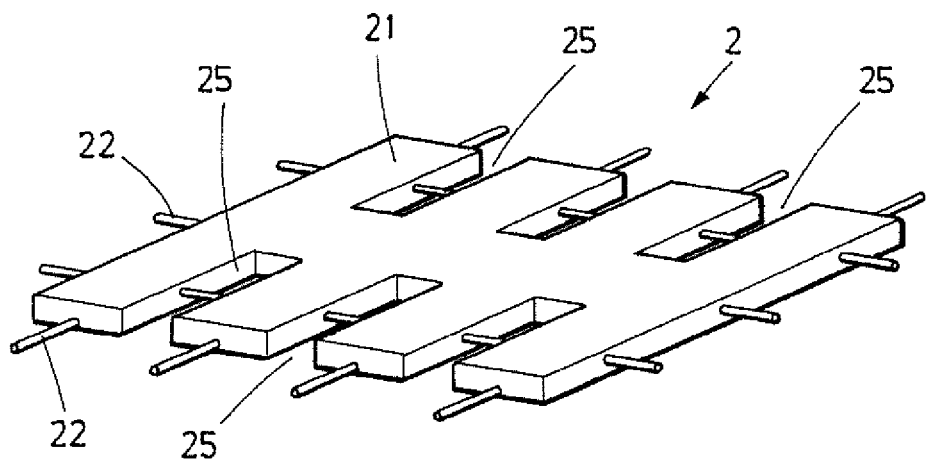
FIGS. 10A and 10B are schematic perspective views of part of a cover according to an embodiment of the invention.
Figure 10B:
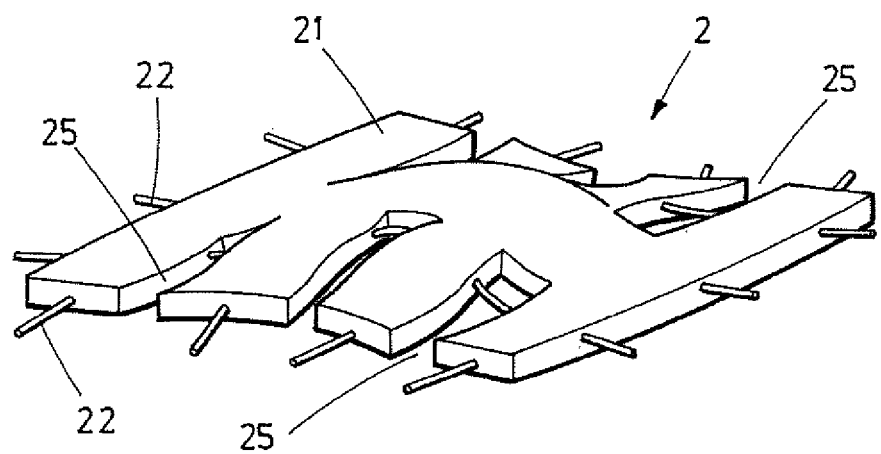

FIGS. 10A and 10B schematically illustrate a cover according to an embodiment of the invention, or part thereof. A layer of elastomeric material 21 is rigidified by the presence of a plurality of rigidifying rods 22 featuring a higher rigidity than the material of the layer 21. The layer 21 includes a plurality of through holes or openings 25 that facilitate the adaptation of the curved shape of the layer 21 without any generation of substantial undesired folds or wrinkles in the layer 21.

Figure 11A:
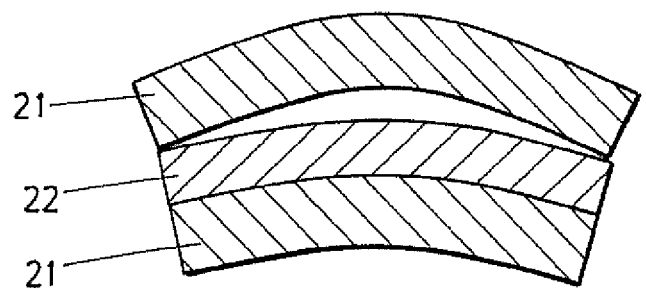
FIGS. 11A and 11B schematically illustrate a detail of a cross section of the cover in accordance with two alternative embodiments of the invention.
Figure 11B:
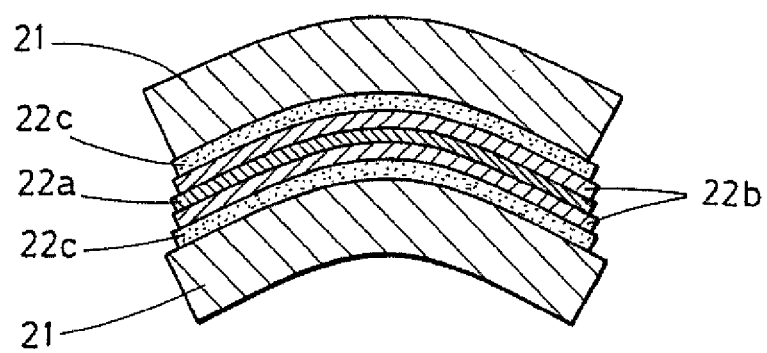

FIG. 11A schematically illustrates a cross section of the cover in accordance with one embodiment of the invention in which the rigidifying rod 22 is made up of one single material featuring high rigidity. Where the cover is curved, the large difference in rigidity between the rigidifying member 22 and the elastomeric material of the layer 21 may give rise to an undesired deformation of the layer 21, as schematically illustrated in FIG. 11A. FIG. 11B shows an alternative embodiment in which the rigidifying member 22 comprises a core 22a of a material having a high rigidity, a first layer 22b surrounding the core and being of a material having a lower rigidity than the material of the core, and a second layer 22c surrounding the first layer 22b and being of a material featuring a lower rigidity than the material of the first layer 22b, but a higher rigidity than the elastomeric material of layer 21 of the cover.

Figure 12A:
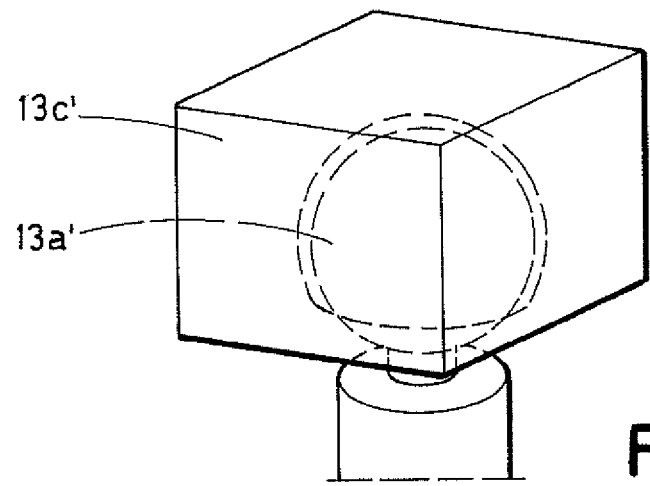
FIGS. 12A-12C schematically illustrate the arrangement of three ball joints in relation to the plate, in accordance with one possible embodiment of the invention.
Figure 12B:
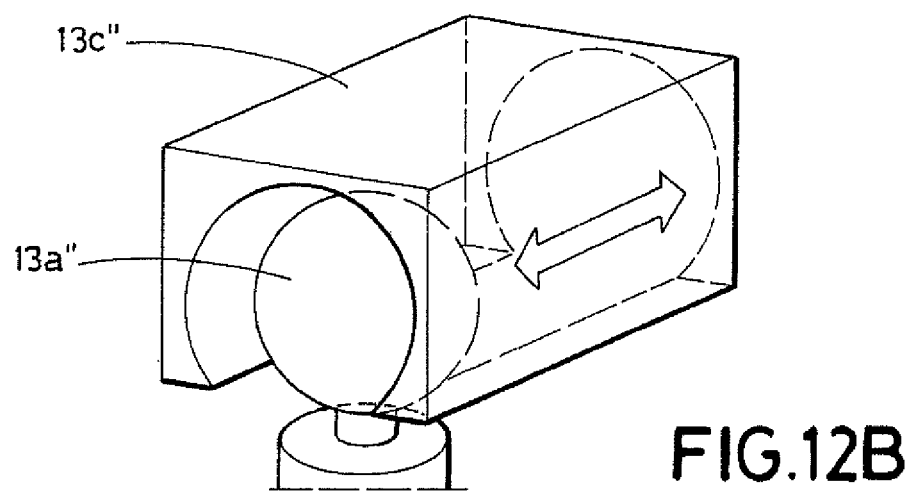
Figure 12C:
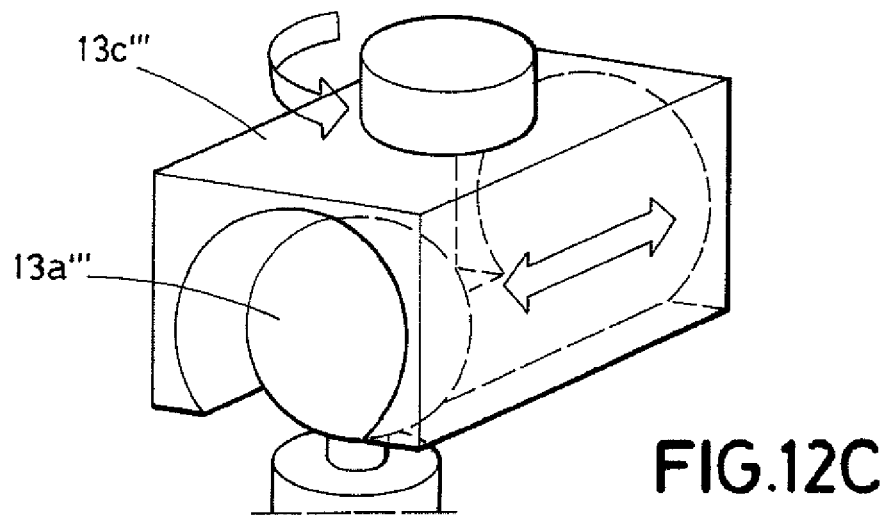

FIGS. 12A-12C schematically illustrate how the three ball joints 13 can be arranged in relation to the plate, to allow the plate to be correctly oriented not only in what regards its vertical position, but also in what regards its inclination, while keeping the controllably extendable members oriented vertically. This can be achieved in many ways, but one simple and cost-efficient configuration, based on the use of only three controllably extendable members, is based on using one ball 13a' (FIG. 12A) that is fixed in relation to the plate (for example, in an element 13c' attached to the plate or forming part of the plate), whereas the other two balls 13a" (FIGS. 12B) and 13a'" (FIG. 12C) are arranged on or in some kind of tracks or similar that allow the ball to move translationally, such as linearly, in relation to the plate, for example, in a guide 13c" (FIGS. 12B) and 13c'" (FIG. 12C) in which the ball of the respective ball joint is placed. In the case of the third ball 13a'", and additional degree of freedom is provided by the possibility of rotation or pivotation of the track or guide 13c'", as schematically illustrated in FIG. 12C.

Figures 13A, 13B, 13C:
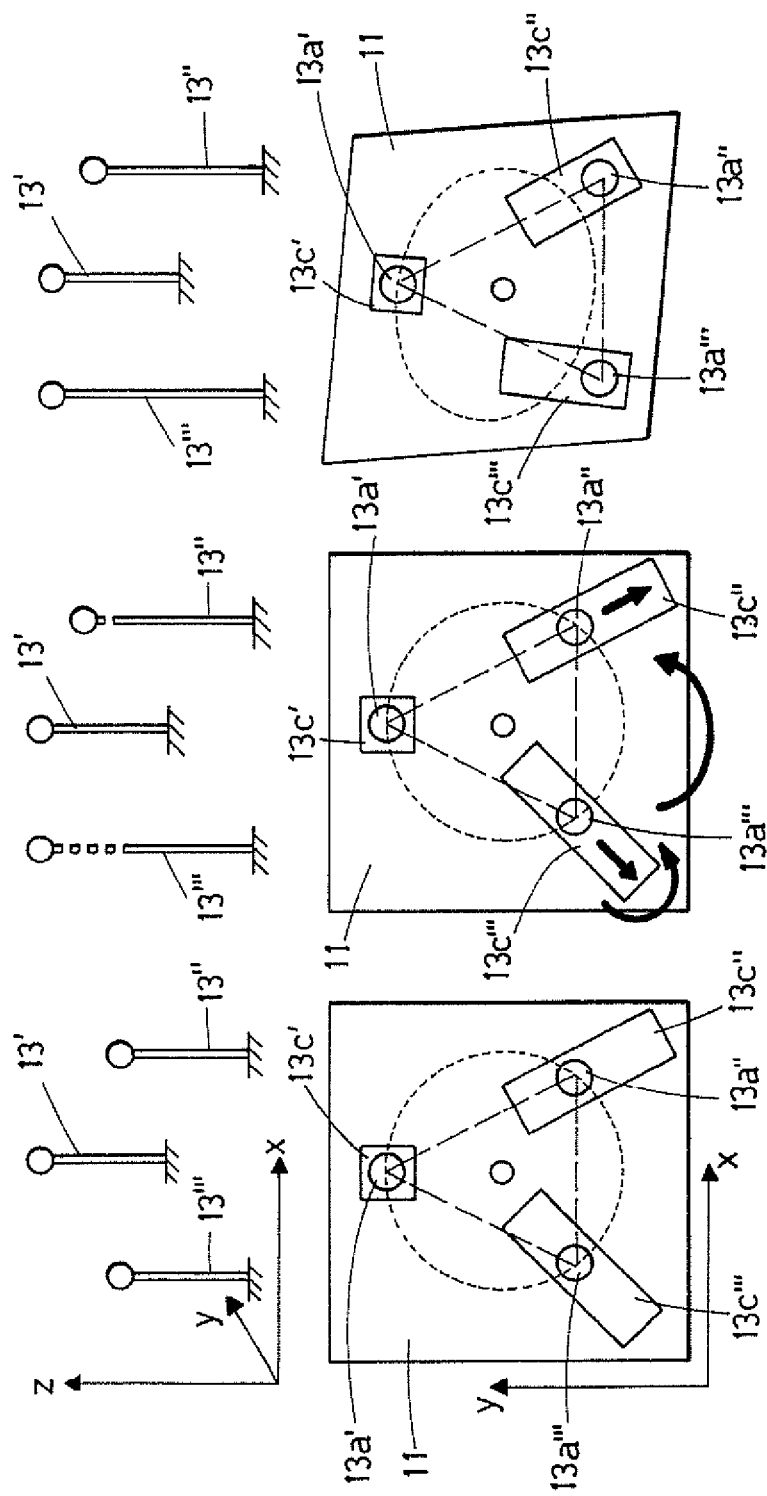

FIGS. 13A-13C schematically illustrate the relation between the extension of the controllably extendable members and the degrees of freedom of the ball joints, in a system as envisaged in FIGS. 12A-12C. FIG. 13A illustrates an initial start position in which all of the controllably extendable members 13', 13" and 13'" have the same length. FIG. 13B schematically illustrate the movements that take place when the controllably extendable member 13'" is extended two twice its original length, whereas the controllably extendable member 13" is extended to 1.5 times its original length, whereas the controllably extendable member 13' remains unchanged. This gives rise to a substantial inclination of the plate 11, and this is allowed for by a sliding movement of the balls 13a" and 13a'" along their tracks 13c" and 13c'", respectively, and by pivotation of the track 13c'" of one of these balls 13a'", until arriving at the end position schematically illustrated in FIG. 13C. Thus, in this way, and due to the additional degrees of freedom provided by the arrangements shown in FIG. 12B (in addition to the three degrees of freedom inherent to the ball joint, a further degree of freedom has been added by the linear movement of the ball along the track) and 12C (here, two additional degrees of freedom have been added: the one corresponding to the linear movement along the track, and the one corresponding to the pivotation of the track), a large number of different positions and inclinations can be achieved by simply extending and/or retracting the controllably extendable members, allowing the balls or the entire ball joints to move in relation to the plate 11 as suggested. Obviously, many other implementations are possible. For example, to accommodate large differences in extension between the controllably extendable members, it may be preferred to add further degrees of freedom, for example, by using a larger number of controllably extendable members, for example, six controllably extendable members adopting a Gough-Stewart platform configuration. However, it is often preferred to use a limited number of controllably extendable members, to minimize manufacture and/or maintenance costs.

In this text, the term "comprises" and its derivations (such as "comprising", etc.) should not be understood in an excluding sense, that is, these terms should not be interpreted as excluding the possibility that what is described and defined may include further elements, steps, etc.

Unless otherwise specified, any indicated ranges include the recited end points.

The invention is obviously not limited to the specific embodiment(s) described herein, but also encompasses any variations that may be considered by any person skilled in the art (for example, as regards the choice of materials, dimensions, components, configuration, number of elements, etc.), within the general scope of the invention as defined in the claims.

The invention claimed is:

1. A system for supporting workpieces, the system comprising a base and a plurality of support members (1), each support member (1) comprising a plate (11) and means for positioning the plate (11) in relation to the base,
   wherein in at least some of the plurality of support members (1), the means for positioning the plate (11) comprise at least three controllably extendable members (13) each arranged at a distance from each other for determining the position, and inclination of the plate (11) in relation to the base, thereby allowing for controlled positioning of the plate (11) in relation to the base and for controlled inclination of the plate (11).

2. The system according to claim 1, further comprising a flexible cover (2) supported by the plates (11), whereby the shape of the cover is at least in part determined by the positions and orientations of the plates (11).

3. The system according to claim 2, wherein more than one of the at least some of the plurality of support members (1) include, in correspondence with the plate (11), at least one roller (12) for attachment to the flexible cover (2), the roller (12) being capable of rotation around at least one axis.

4. The system according to claim 3, wherein the roller (12) is capable of rotation around at least two axes (X, Y).

5. The system according to claim 4, wherein the roller (12) is capable of rotation around at least one axis (X) parallel with a top surface of the plate (11), and around one axis (Y) perpendicular to the top surface of the plate (11).

6. The system according to claim 3, wherein the roller (12) is configured for attachment to the cover by magnetic means, by adhesive, by velcro (12c), or by vacuum.

7. The system according to claim 3, wherein more than one of the at least some of the plurality of support members include means (14) for blocking rotation of the roller (12).

8. The system according to claim 3, wherein the roller (12) has a substantially spherical or cylindrical shape.

9. The system according to claim 2, wherein the cover (2) comprises a layer (21) of an elastomeric material, and wherein the cover additionally comprises a plurality of rigidifying members (22) of a material having a higher rigidity than the material of the layer (21), wherein the rigidifying members (22) are arranged so that they are axially displaceable in relation to the layer (21).

10. The system according to claim 9, wherein
   at least some of the rigidifying members (22) comprise a core (22a) of a material having higher rigidity than the elastomeric material, the core being surrounded by at least one layer (22b, 22c) of a material having a lower rigidity than the material of the core (22a) but a higher rigidity than the elastomeric material, and/or wherein the cover comprises through holes (25).

11. The system according to claim 1, wherein at least some of the Controllably extendable members (13) comprise actuator's.

12. The system according to claim 1, wherein more than one of the at least some of the plurality of support members comprise passive controllably extendable members (13), and wherein the support members with passive controllably extendable members additionally comprise a drive member (14) for driving the plate (11) away from the base, whereby the controllably extendable members (13) are configured to each extend while the plate is being driven away from the base, until reaching a pre-selected extension, whereby further extension of the controllably extendable member is prevented when its pre-selected extension is reached, wherein the drive member optionally comprises at least one inflatable element (14).

13. The system according to claim 1, wherein the controllably extendible members (13) are attached to the respective plate (11) by ball joints (13*a*).

14. The system according to claim 13, wherein at least two of the ball joints (13*a*) are arranged for allowing a translational movement thereof in relation to the plate, so that the distance between the ball joints can change as a consequence of extension and retraction of the controllably extendible members.

15. Method of modifying the three-dimensional shape of the cover of a system for supporting workpieces, the system comprising a base and a plurality of support members (1), each of the plurality of support members (1) comprising a plate (11) and means for positioning the plate (11) in relation to the base,
 wherein in at least some of the plurality of support members (1), the means for positioning the plate (11) comprises at least three extendable members (13) arranged for determining the position and inclination of the plate (11) in relation to the base, thereby allowing for controlled positioning of the plate (11) in relation to the base and for controlled inclination of the plates (11), and a flexible cover (2) supported by the plates (11), and in correspondence with the plates (11),
 wherein more than one of the at least some of the plurality of support members (1) include, in correspondence with the plate (11), at least one roller (12) for attachment to the flexible cover (2), the roller (12) being capable of rotation around at least one axis, the method comprising the steps of:
modifying the position and inclination of a plurality of the plates (11) by selective extension and/or retraction of the three controllably extendable members (13), while allowing the rollers (12) to rotate;
thereafter, blocking the rollers (12) so as to prevent them from rotating.

* * * * *